United States Patent [19]

Nestlen

[11] Patent Number: 4,615,368
[45] Date of Patent: Oct. 7, 1986

[54] APPARATUS FOR DETACHABLY FASTENING LATERAL CABLE IN TIRE CHAIN

[75] Inventor: David J. Nestlen, Portland, Oreg.

[73] Assignee: LaGrand Chain Corporation, Portland, Oreg.

[21] Appl. No.: 666,353

[22] Filed: Oct. 30, 1984

[51] Int. Cl.$^4$ ............................................. B60C 27/06
[52] U.S. Cl. ........................... 152/213 A; 24/69 TT; 24/71 TT; 24/134 KA; 29/526 R; 152/219; 152/242; 403/206; 403/353
[58] Field of Search ............... 152/231, 233, 239, 241, 152/242, 213 R, 213 A, 216, 217, 219, 240, 172, 177, 179, 184, 189, 191; 24/134 KA, 136 L, 136 K, 68 CT, 69 TT, 70 CT, 70 TT, 69 WT, 71 TT; 29/526 R; 403/206, 353

[56] References Cited

U.S. PATENT DOCUMENTS

| | | | |
|---|---|---|---|
| 2,234,492 | 3/1941 | Henry | 152/242 |
| 2,606,591 | 8/1952 | Nixon | 152/242 |
| 3,100,323 | 8/1963 | Baker | 403/353 |
| 3,752,204 | 8/1973 | Ouellette | 152/219 |
| 4,155,389 | 5/1979 | Dwinell | 152/221 |
| 4,280,545 | 7/1981 | Martinelli | 152/222 |
| 4,321,956 | 3/1982 | Martinelli | 152/222 |
| 4,366,850 | 1/1983 | Coutts | 152/242 X |

FOREIGN PATENT DOCUMENTS 352918  4/1961  Switzerland .

Primary Examiner—Edward Kimlin
Assistant Examiner—Thomas Bokan
Attorney, Agent, or Firm—Kolisch, Hartwell & Dickinson

[57] ABSTRACT

A novel apparatus for detachably securing together the opposed ends of a lateral cable in a tire chain mounted on a tire. The apparatus includes a plurality of spaced-apart anchor members mounted on one end of the lateral cable and a generally U-shaped clasp joined to the other end of the cable. The clasp includes a base, a first expanse which is joined to and extends outwardly from the base at a right angle, and a second expanse, forming part of the other end of the clasp, which is joined to and projects outwardly from the base, and is inclined away from the first expanse. The clasp further includes an elongate slot which extends longitudinally of the clasp, with opposite ends in the first and second expanses, and having in the second expanse an enlarged portion which accommodates passage therethrough of an anchor member.

4 Claims, 6 Drawing Figures

U.S. Patent   Oct. 7, 1986   4,615,368
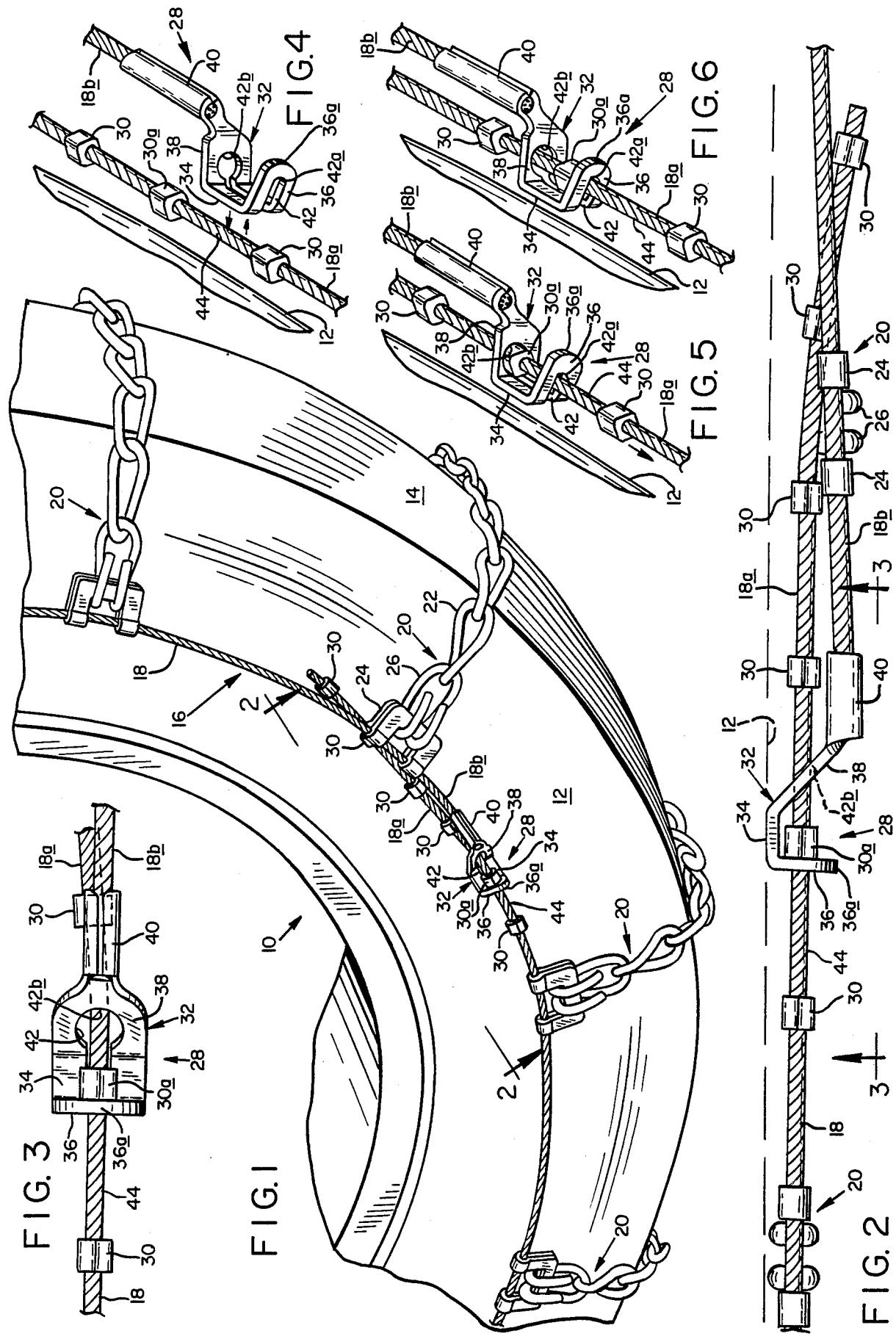

APPARATUS FOR DETACHABLY FASTENING LATERAL CABLE IN TIRE CHAIN

BACKGROUND AND SUMMARY OF THE INVENTION

The present invention relates to cable tire chains and, more particularly, to a novel cable tire chain fastener and method for detachably connecting the opposite ends of a lateral cable in a tire chain.

Conventional tire chain fasteners, such as the type disclosed in Ouellette, U.S. Pat. No. 3,752,204, include a plurality of spaced-apart knubs or abutment elements mounted on one end region of a lateral cable in a tire chain, and an L-shaped retaining member having a shorter first portion joined at a right angle to a longer second portion, with the end of the second portion rolled around the other end region of the lateral cable. A longitudinal keyhole slot is formed in the retaining member, which extends from the first portion into the second portion, terminating in an opening in the second portion adjacent its rolled end. In a fastening operation, the end of the cable containing the abutment elements is inserted through the opening in the retaining member, in a relative position wherein the end region of the cable containing the abutment elements is normal to the second portion of the retaining member. The cable end is inserted until it reaches the desired point of cable tightness. It is then rotated to a relative position wherein its longitudinal axis is substantially parallel to the longitudinal axis of the other end region of the cable, with an abutment element adjacent the inner side of the first portion. The loose end region with the abutment elements is then snapped into a holding clip mounted on the other end of the cable. Additional clips are frequently necessary to prevent flapping of the cable against the fender well.

It can be appreciated that installation of tire chains is a difficult chore which is routinely performed under inclement weather conditions. The method of fastening the cable ends by threading the cable end with the knubs through the keyhole slot in the retaining member is a difficult and cumbersome process, particularly when connecting the cable adjacent the inner sidewall of the tire.

Furthermore, in order to accomplish this threading operation it is necessary that a certain amount of slack be left in the cable line. This increased slack in the lateral cable causes an overall looseness of the tire chain which, not only contributes to excessive tire wear, but also can damage the vehicle's fender wells.

An additional problem with conventional tire chain fasteners is the need to provide holding clips to secure the loose end of the lateral cable containing the abutment elements. These clips are typically constructed of a hard rubber or metal. Due to the stiffness of these clips, they are difficult to operate because they require that a great deal of force be placed on the cable to push it into the receiving member of the clip.

Furthermore, these clips are often damaged or fall off, thus potentially rendering the entire chain unfit for use, because such an unsecured end would damage the vehicle. Also, an unsecured cable end could accidentally disengage from the L-shaped member and cause the tire chain to fall off the tire.

It is very important with the newer model automobiles, particularly those with front wheel drive, that this cable end is securely held in place. If it is loose, considerable damage may occur to such vehicles. It is also important that the cable end be secured, in order for the chain to meet recommended vehicle clearance standards, such as those established by SAE.

Accordingly, it is a general object of the present invention to provide a novel method and means for rapidly and simply securing the opposed ends of a lateral cable in a tire chain.

Another object of the present invention is to provide a method and means for fastening the opposed ends of the lateral cable which require a minimum of slack in the cable line to accomplish the fastening operation, thus resulting in a tighter fit of the chain on the tire.

A further object of the invention is to provide a method and means for fastening the opposed ends of the cable that eliminate the need for holding clips.

A preferred embodiment of the proposed apparatus of the invention includes at least one anchor member mounted on one end of a lateral cable of a tire chain and a generally U-shaped clasp joined to the other end. The clasp includes a base, a first expanse which is joined to and extends outwardly from the base at a right angle, and a second expanse, forming a part of the other end of the clasp, which is joined to the base and projects outwardly from the base at an incline away from the first expanse. The clasp further includes an elongate slot extending longitudinally of clasp with opposite ends in the first and second expanses, terminating in the second expanse in an enlarged portion which accommodates passage therethrough of an anchor member.

In operation, a stretch of the end region of the cable containing the anchor member is moved laterally into the clasp through the slot, placing the stretch through the opposite ends of the slot, with an anchor member located just outside of the clasp. The cable is then shifted in a lengthwise direction to move the anchor member from its position outside the clasp to a position where the anchor rests snugly against the inner side of the first expanse. The loose end of the cable containing the anchor member extends through the enlarged portion of the slot, to a position located between the other end region of the cable and the side of the tire. So positioned, the loose end is held snugly, intermediate the other end region of the cable and the side of the tire.

With the process and construction described, it can be seen that the ends of the lateral cable are quickly and easily fastened and that, by eliminating the threading step, a minimum of slack is needed in the line to accomplish the fastening operation. Further, with the unique construction described, the need for using holding clips is avoided.

These and other objects and advantages of the present invention will become more clearly understood from a consideration of the drawings and the following detailed description of a preferred embodiment.

BRIEF DESCRIPTION OF THE DRAWINGS

FIG. 1 is a side perspective partial view of a tire chain mounted on a tire, illustrating the fastener means according to the present invention.

FIG. 2 is an enlarged cross sectional view taken generally along line 2—2 in FIG. 1, further illustrating the fastener means of the invention.

FIG. 3 is an enlarged cross sectional view taken generally along line 3—3 in FIG. 2.

FIG. 4 is an enlarged side perspective view, similar to FIG. 1, illustrating the relative position of the end region of the lateral cable containing the anchor members intermediate the tire sidewall and the clasp, just prior to insertion of a stretch of the lateral cable into the elongate slot of the clasp.

FIG. 5 is a view similar to FIG. 4, illustrating movement of an anchor member through the enlarged portion of the slot.

FIG. 6 is a view similar to FIGS. 4 and 5, illustrating a relative position wherein the end region of the cable with the anchor members has been shifted in a lengthwise direction thereby moving an anchor member against the inner side of the free end of the clasp.

DETAILED DESCRIPTION OF A PREFERRED EMBODIMENT OF THE INVENTION

Referring now to the drawings and, more particularly to FIG. 1, there is shown generally at 10 a tire having an outer side or sidewall 12 and a tread 14. Mounted on tire 12 is a cable tire chain shown generally at 16.

The tire chain includes an outer, lateral wire cable 18, extending circumferentially about outer sidewall 12, with opposed ends or end regions 18a, 18b, and an inner, lateral cable of the same construction (hidden from view). Cross chains, such as indicated generally at 20, overlap tread 14 of tire 10 to provide traction for the vehicle. Cross chain 20 comprises a series of interconnecting links 22 connected at its opposite ends to the lateral cables by an articulated bracket and an end link arrangement, such as indicated respectively at 24 and 26.

Turning now to the details of the apparatus of the present invention, indicated generally at 28, is a fastener means or means for detachably securing or connecting together opposed ends 18a, 18b of lateral cable 18. FIGS. 1, 2, 3 and 6 illustrate fastener 28 in a connected position.

Disposed adjacent and mounted on lateral cable 18a are spaced-apart anchor members 30. The width of anchor members 30 exceeds the diameter of lateral cable 18. Although anchor members 30 are shown in this illustration as being square in shape, it will be appreciated that other polyhedral, as well as cylindrical, shapes may be used as well. Anchor members 30 are mounted on cable 18 in a spaced-apart relationship and are approximately 182 to 7/8ths of an inch apart. Such spacing accommodates adjustment of the lateral cables to varying diameters to enable usage of chain 16 various sizes of tires.

Focusing attention on FIGS. 2 and 3, there is shown generally at 32 a generally U-shaped metal clasp which is approximately 1/16 of an inch thick. Clasp 32 includes a substantially rectangular bottom portion or base 34, a first expanse 36, and a second expanse 38.

First expanse 36, which forms the free end 36a of clasp 32, is joined to base 34 at one extremity of the base and extends outwardly at substantially a right angle therefrom. This angle of joinder between base 34 and first expanse 36 is best illustrated in FIG. 2.

Second expanse 38, which forms part of the other end of clasp 32, is joined to base 34 at the latter's opposite extremity from first expanse 36 and is inclined away from the first expanse, forming substantially an obtuse angle with respect to base 34. This inclined relationship of expanse 38 to base 34 is best seen in FIG. 2.

Clasp 32 further includes an elongate wrapped region 40 which joins the clasp to end 18b of lateral cable 18. Wrapped region 40 extends substantially normal with respect to first expanse 36. Region 40 is circumferentially wrapped about end 18b.

Focusing attention now on FIGS. 3 and 4, an elongate slot 42 extends longitudinally of clasp 32 from end 42a located in first expanse 36 to an opposite end, or enlarged portion, 42b in second expanse 38. Enlarged portion 42b is generally circular, and has a diameter which is larger than the width of the remainder of slot 42. As can best be seen from FIG. 4, slot 42, between its ends 42a, 42b, divides base 34. The width, or diameter, of enlarged portion 42b must be sufficiently greater than the width of anchor member 30 to accommodate passage therethrough of anchor member 30. It has been found that a width of ¼ of an inch for anchor members 30 and a diameter of ⅜ths of an inch for enlarged portion 42b is desirable. It is also been found that a diameter of ⅛th of an inch for lateral cable 18 as compared to a width 3/16th of an inch in the remainder of the slot is desirable to accommodate, in an engaged position, a stretch 44 of end region 18a of the lateral cable.

Turning now to a description of an actual fastening operation utilizing fastener 28, attention is initially focused on FIG. 4 showing a selected stretch 44 of cable 18, located between two anchor members 30, 30a disposed on end region 18a, which is about to be inserted into slot 42 of clasp 32. Stretch 44 is then moved in a lateral direction through slot 42, where such extends along base 34 to place stretch 44 in a position where it extends from slot end 42a to slot end 42b. In this position, anchor member 30a is located to one side of clasp 32, adjacent second expanse 38.

Next, as shown in FIG. 5, stretch 44 is shifted in a lengthwise direction with the stretch positioned in clasp 32 to move anchor member 30a through enlarged portion 42b from its position outside clasp 32. Sometimes movement of anchor member 30a is facilitated by canting second expanse 38 to expose a greater area of enlarged portion 42b.

FIG. 6 demonstrates a fastened-condition wherein anchor member 30a rests snugly against the inner side of first expanse 36, with the plane of base 34 adjacent and substantially parallel to sidewall 12 of the tire. So oriented, end region 18a extends through slot end 42a, 42b in a position subtending base 34. Thus positioned, clasp 32 secures together opposed ends 18a and 18b of lateral cable 18.

Also, as can best be seen from FIGS. 1 and 2, end region 18a of the cable extends through opposite ends 42a, 42b of slot 42 to a position located between end region 18b of the cable and side 12 of the tire. So positioned, end 18a is securly held in place thereby eliminating the need for any type of holding clip.

It has been found through repeated testing that fastener means 28 securely holds ends 18a and 18b together when mounted on a tire, and does not accidentally disengage.

From the above disclosure, it can be appreciated that fastener means 28 provides a simple and rapid method for detachably connecting the opposed ends of the lateral cable in a tire chain. Further, the above-described method of attachment, i.e., moving the selected portion of the cable stretch laterally into the slot of the clasp, results in a tighter adjustment of the lateral cable as compared to prior art fasteners, such as of the type disclosed by Ouellette in U.S. Pat. No. 3,752,204. This is because the method of my invention requires a minimum amount of slack in the cable line in order to accomplish the fastening operation, whereas in the Ouellette patent the stretch of cable containing the abutment elements must be threaded through the keyhole in the L-shaped member requiring a greater amount of slack in the line than with my invention.

Because of the unique construction of the fastener, any necessity for holding clips to secure the loose end of the cable is eliminated. This is a considerable advantage over the prior art because, as previously pointed out, these holding clips are stiff and difficult to engage and may be lost or broken. thereby rendering such a chain useless for its intended purpose.

In removing the tire chain, detachment of fastener means 28 is an easy matter, requiring lengthwise movement of strand 44 in a direction opposite from the direction of attachment and lateral movement of clasp 32 away from the strand and the tire.

While a particular embodiment of the invention has been described it should be obvious that variations and modifications are possible without departing from the spirit of the invention.

It is claimed and desired to secure by letters patent:

1. Detachable fastener means for detachably securing together the opposed ends of a lateral cable in a tire chain comprising:

at least one anchor member disposed adjacent and mounted on one of the ends of the lateral cable, and a generally U-shaped clasp which includes a bottom portion, a first expanse forming the free end of the clasp joined to the bottom portion at one extremity of the bottom portion and extending out at an angle therefrom, and a second expanse forming at least part of the other end of the clasp joined to the bottom portion at the latter's opposite extremity and extending out at an angle therefrom and to the same side of the bottom portion as the first expanse, said second expanse being joined to the other end of said lateral cable, said clasp further having an elongate slot extending longitudinally of the clasp from one end of the slot, which is located in and extends along said first expanse, to an opposite end which is located in and extends along said second expanse, the slot between said ends dividing the base portion of the clasp, said slot at its said opposite end having an enlarged portion by reason of a width enlarged from that of the remainder of the slot, said second expanse joining with the other end of said lateral cable at a location disposed outwardly of said enlarged portion of the slot from said bottom portion of the clasp, said enlarged portion of the slot accommodating passage therethrough of said anchor member with the lateral cable in the tire chain oriented with the cable moved through the slot where the slot divides the base whereby the cable extends through one and the other ends of the slot in a position subtending said base.

2. The fastener means of claim 1, wherein said first expanse extends outwardly from said bottom portion at substantially a right angle and wherein said second expanse extends with the expanse inclined away from the first expanse.

3. The fastener means of claim 2, wherein said clasp further includes an elongate wrapped region which joins said clasp to said other end of said lateral cable, said wrapped region extending substantially normal to said first expanse.

4. In combination with a tire having a cable tire chain mounted thereon, the tire chain including a lateral cable extending circumferentially along a lateral side of the tire, means detachably connecting opposite end regions of the lateral cable together comprising:

an anchor member joined to one end region of the lateral cable, and a clasp joined to the other end region of the lateral cable, said clasp being U-shaped and including a base disposed adjacent the side of the tire, a first expanse forming the free end of the clasp joined to said base and extending outwardly from the base and the side of the tire, and a second expanse joined to said base spaced from said first expanse and also projecting outwardly from said base and the side of the tire, said first expanse, base, and second expanse having a slot extending therealong with opposite ends in said first and second expanses, said anchor member resting snugly against the inner side of said first expanse, and said end region of the cable which has the anchor member joined thereto extending through opposite ends of said slot to a terminus located intermediate said other end region of the lateral cable and the side of the tire, the end of said slot in said second expanse being enlarged from the remainder of the slot to permit movement of the anchor member therethrough with the anchor member traveling parallel to said base of the clasp and said clasp being joined to the other end region of the lateral cable through joinder with said second expanse of the clasp at a location disposed outwardly of the enlarged portion of the slot from said base of the clasp.

* * * * *